United States Patent [19]

Nyström et al.

[11] Patent Number: 5,256,386
[45] Date of Patent: Oct. 26, 1993

[54] METHOD FOR PREPARATION OF SILICA PARTICLES

[75] Inventors: Mats Nyström, Kungälv; Wolgang Herrmann, Gothenburg; Bernt Larsson, Hisings Backa, all of Sweden

[73] Assignee: Eka Nobel AB, Surte, Sweden

[21] Appl. No.: 540,307

[22] Filed: Jun. 14, 1990

Related U.S. Application Data

[63] Continuation of Ser. No. 212,620, Jun. 28, 1988, abandoned.

[30] Foreign Application Priority Data

Jun. 29, 1987 [SE] Sweden .............................. 8702685-2

[51] Int. Cl.$^5$ ............................................ C01B 33/12
[52] U.S. Cl. .................................... 423/338; 423/339; 502/8
[58] Field of Search ................... 423/338, 339; 502/8

[56] References Cited

U.S. PATENT DOCUMENTS

| | | | |
|---|---|---|---|
| 2,244,325 | 6/1941 | Bird | 252/313 |
| 2,375,738 | 5/1945 | White | 252/309 |
| 2,573,743 | 11/1951 | Trail | 252/313 |
| 2,574,902 | 11/1951 | Bechtold et al. | 252/313 |
| 2,577,484 | 12/1951 | Rule | 252/313 |
| 2,577,485 | 12/1951 | Rule | 252/313 |
| 2,699,376 | 1/1955 | Hay | 423/335 |
| 2,757,073 | 7/1956 | Drexel | 423/338 |
| 3,059,997 | 10/1962 | Schwartz | 423/338 |
| 3,652,215 | 3/1972 | Aboutboul et al. | 423/338 |
| 3,839,385 | 10/1974 | Meiller et al. | 260/448.2 B |
| 4,011,096 | 3/1977 | Sandell | 502/8 |
| 4,070,286 | 1/1978 | Iler et al. | 502/8 |
| 4,384,045 | 5/1983 | Ho et al. | 435/176 |

FOREIGN PATENT DOCUMENTS

| | | |
|---|---|---|
| 0067459 | 12/1982 | European Pat. Off. |
| 0221780 | 5/1987 | European Pat. Off. |
| 60-90812 | 5/1985 | Japan ............... 423/338 |
| 1334606 | 10/1973 | United Kingdom |

*Primary Examiner*—Jack Cooper
*Attorney, Agent, or Firm*—Burns, Doane, Swecker & Mathis

[57] ABSTRACT

Silica particles which are substantially spherical, have a particle size of 1 to 100 μm, a very narrow pore size distribution and a low alkali metal content. The particles can be prepared by sol-gel technique using emulsification technique for drop formation. The process comprises a sol growth step in a basic environment based on ammonium or amines and a post-treatment in such an environment. The silica particles are particularly suitable for use in chromatography as they have very good particle and porosity properties and high purity.

12 Claims, No Drawings

METHOD FOR PREPARATION OF SILICA PARTICLES

This application is a continuation of application Ser. No. 07/212,620, filed Jun. 28, 1988, now abandoned.

The present invention relates to substantially spherical silica particles, to a method for preparation of the particles and to their use, especially in chromatography. More particularly the invention relates to silica particles which have a very low alkali metal content and both a well-defined particle size and well-defined pore characteristics.

Silica particles, i.e. porous silicon dioxide particles formed from amorphous $SiO_2$, are used in several applications, for example as catalysts, catalyst carriers, as packing material in chromatography equipment, as ion exchangers etc, and in the different applications there are different requirements on, for example, the purity of the particles, their alkali metal content, the size, pore characteristics, mechanical strength etc.

Most methods for the preparation of substantially spherical silica particles are based on a sol-gel transformation and comprise mechanically subdividing a solution containing polymerisable, gellable silica material, e.g. water glass or $SiO_2$-sol, into fine drops which are subsequently allowed to form solid gel particles through a suitable treatment for gel formation. The drop formation can be carried out in several ways, e.g. in gas phase by using spray nozzles or other similar atomizing equipment or in a liquid phase by emulsification of the solution of silica material in a liquid which is not miscible with the solution. The gel formation can also be carried out in several ways and as some examples can be mentioned dewatering and heat treatment of the drops in a hot gas atmosphere, e.g. in a spray drier, or by spraying the drops into a liquid containing a substance which causes the gel formation. When the above described emulsion technique is utilized a gel accelerating substance can be added to the emulsion and the emulsion can then be heated or evaporated in order to obtain solid gel particles. The transformation of the drops of silica containing material to "solid" gel particles does not occur instantaneously but can rather be considered as a successive process giving possibilities of controlling certain of the properties of the produced particles.

The present invention relates to substantially spherical silica particles which are characteristic in that they have a very low alkali metal content, a specified particle size and very good pore characteristics.

The highest demands on silica particles are probably set in chromatography applications and particularly if the particles are to be utilized for separation of sensitive substances such as biomolecules and at so-called HPLC chromatography, high performance liquid chromatography. Herein it is required that the particles have a very high purity in order not to have a negative effect on the separation, impurities of alkali metals, iron and aluminum do, for example, have a negative effect on the recovery of biomolecules such as proteins, and at the same time it is required that the particles have very well-defined and good porosity properties. In order to give good packing and flow properties it is required that the particles have a substantially spherical form, a comparatively small mean diameter and a comparatively narrow particle size distribution. With regard to porosity the particles should have as great porosity, pore volume, as possible while maintaining a good mechanical strength. The particles should have a narrow pore size distribution, i.e. the pores are not allowed to have more than very minor deviations from the mean pore diameter, and at the same time it should be possible to control the latter with regard to the size of the molecules which are to be separated. In chromatography it is also very important that the silica particles are practically free from micropores, i.e. pores having a size below half of the mean pore size, since such pores give rise to several negative effects and influence, for example, the mass transport in the bed which means that the chromatography peak will not be distinct. Furthermore, large molecules such as proteins can be trapped in the micropores which not only reduces the yield but also causes problem with regeneration of the bed.

The silica particles of the present invention have such a degree of purity and such pore characteristics that they are especially well suited for highly qualified chromatography purposes and they can of course also be used in other conventional applications for silica particles.

The silica particles according to the invention are substantially spherical and have a size within the range of from 1 μm to 100 μm, a pore size distribution where the part of pore volume within the range of from 0.5d to 1.5d, where d is the mean pore diameter, is greater than 90%. The particles are further characterized in that they have an alkali metal content below 100 ppm.

Particles according to the invention with a mean size within the range of from 3 to 50 μm, and particularly within the range of from 3 to 30 μm, are preferred with regard to the use in chromatography. The mean pore diameter, d, is suitably within the range from 6 to 50 nm (measured with $N_2$-absorption and defined as d=4000xpore volume/BET area) and the part of pore volume within the range of from 0.5d to 1.5d is suitably greater than 94%. The pore size distribution which is given is measured by sorption of liquid nitrogen, with an instrument such as Digisorb 2600 or a corresponding instrument, which means that also the very fine pores are measured and the given values thus comprise, in principle, the entire pore volume. The pore volume in ml/g $SiO_2$ for the particles is suitably above 0.50 and is preferably within the range of from 0.5 to 1.5 ml/g, measured with $N_2$-sorption. It is preferred that the spherical particles according to the invention are formed from sol particles, colloidal $SiO_2$ particles, of non-uniform size. The total amount of alkali metals, iron and aluminium in the particles is preferably below 100 ppm. The alkali metal content is preferably below 50 ppm. Further preferred properties and characteristics for the particles will be evident from the following in connection with the disclosure of a process for the production of particles having the above stated characteristics.

The present invention thus also relates to a method for the preparation of particles having a high degree of purity and porosity characteristics as disclosed above. The method of the invention is especially adapted for the preparation of silica particles which fulfil the extremely high requirements on such particles for use in highly qualified chromatographic processes and the method comprises steps which, per se and in combination, contribute both to a high purity and to control of the particle size and particle porosity to desired values. The total process is particularly directed to removal of alkali metals in an early stage and to see to it that alkali metals are not anew brought into the process and to carry this out in such a manner that the possibilities of controlling both particle size and porosity are as great as possible. The method is based on sol-gel transformation and comprises emulsion technology for drop formation in order to hereby increase the possibilities of controlling physical properties, particularly particle shape and pore volume, which is not possible in the same manner when a gas atmosphere and spray drying equipment are used, since drop formation and gel formation herein occur comparatively rapidly, and probably also at the same time, It is characteristic for the method of the invention that a basic environment based on ammonium or amines is used both in a sol growth step and in a post-treatment step. The utilization of such a basic environment is essential both for keeping the alkali metal content at as low level as possible and to obtain maximally good particle and porosity properties.

The method of the invention for the preparation of silica particles comprises the following steps:

1) preparation of at least one acid, aqueous silica sol having an alkali metal content below 100 ppm and a particle size essentially below 3 nm 2) heat treatment of the prepared sol in ammonium or amine based basic environment for growth of the sol particles to a size corresponding to an area within the range of from 50 to 500 $m^2/g$ 3) emulsification of the sol, after optional concentration, in an organic medium which is not miscible with water, or has a limited miscibility or solubility with water, and in the presence of a surface active agent 4) gelling of the formed sol drops by dewatering under controlled temperature and pH conditions 5) heat treatment of the produced gel particles for removal of substantially all organic material 6) post-treatment of the gel particles comprising treatment in a basic environment based on ammonium or amines.

The process described above gives the essential steps for obtaining the advantageous purity and porosity properties. Additional, per se conventional, steps can of course be included and will be discussed below.

Step 1 in the above described process involves the preparation of a very pure, acid silica sol. This is a fundamental part of the present process and is combined with subsequent steps which are carried out in such a manner that impurities in the form of alkali metals or metals such as iron and aluminum are not anew brought into the process and the final product will as a result have a very low alkali metal content, less than 100 ppm, and also very low contents of iron and aluminum, preferably a total content of alkali metal, iron and aluminium below 100 ppm. If, for example, aluminum is present at the production of water glass for the sol, impurities are formed which are extremely difficult to remove in subsequent steps. The preparation of the pure silica sol can be carried out according to the following.

Starting from a pure $SiO_2$ material, with low levels of metal impurities, alkali water glass, potassium or sodium water glass, preferably sodium water glass, is prepared in per se known manner by utilization of pure NaOH or KOH. The mole ratio of $SiO_2$ to $Na_2O$ or $K_2O$ is not critical and can, as known, be within the range of from 1.5:1 to 4.5:1 and is suitably within the range of from 2.5:1 to 3.5:1. Alkali metal ions are then removed from the produced water glass to an alkali metal content of less than 100 ppm, and preferably less than 50 ppm. This is suitably made using a cation exchanger saturated with $H^+$ so that the pH of the solution after the ion exchange is below 4.5 and preferably below 4. The water glass content at the ion exchange is not critical but is generally within the range of from 2 to 7 percent by weight of $SiO_2$. The produced acid sol has a particle size substantially below 3 nm. There are also other possibilities of preparing pure, acid sol and such a sol can for example be prepared starting from tetraethoxysilane. According to the invention it is essential that alkali metals are removed already at this early stage. In several known processes alkali metals are removed first in a final stage. The alkali metal will hereby be built into the sol particles during the preparation and it will not be possible to later reduce the contents in a technically economic manner to the low levels which are considered here.

The next step in the method is a sol growth step which is carried out through a heat treatment in a basic environment based on ammonium or amine. It is extremely important according to the invention that the sol growth is carried out in such a medium and not, as conventional, in a NaOH-environment. By utilizing a basic environment based on ammonium or amine the building-in of sodium in the sol particles is avoided and at the same time the presence of this base in the following emulsification step gives improved pore properties. In the sol growth step in this manner a first and essential part of the control of the final particle size and particle size distribution takes place. The sol particles shall in this step grow to a mean size corresponding to an area within the range of from 50 to 500 $m^2/g$, which corresponds roughly to a particle size of about 55 to about 5 nm. It has been found that it is particularly advantageous that the sol particles here have a particle size distribution which is not uniform but shows a certain scattering, and preferably so that considerably greater sol particles are present in mixture with considerably smaller such particles. It is thus preferred that the colloidal $SiO_2$ particles in the sol which is emulsified and gelled are polydisperse. The polydispersity of the sol particles can be achieved in the growth step starting from one sol by a suitable combination of pH, time and temperature during the heat treatment, or by blending of at least two sols which have been prepared and allowed to grow in ammonium or amine based basic environment according to what has been stated above. To achieve polydispersity it is also possible to mix a sol which has grown with an acid sol which has not grown from step 1. Blending of sols before the emulsification step is thus encompassed by the present process. The heat treatment in step 2) is carried out using times and temperatures which give the desired growth of the sol particle size and these are thus selected with regard to the desired final sol particle size and particle size distribution. The temperature is suitably within the range of from 50° to 150° C. and times of from about 0.5 to about 48 hours can be used. Since the sol which is emulsified and further treated contain particles of varying sizes smaller particles will "glue" the larger ones as an increased number of contact points are obtained. In contrast to when sols with uniformly sized colloidal particles are used both an improved mechanical stability during subsequent preparation steps and a positive influence on the pore structure are obtained, and the possibility of achieving high pore volumes is considerably improved. It is thus preferred that the colloidal particles in the sol are not of a uniform size but that they are of a non-uniform size and show a polydispersity. As a measure of this can be stated that it is suitable that the size of the colloidal particles are spread over a range with the ratio of the largest diameter: the smallest diameter of at least 3. Also very broad distributions with ratios in the order of magnitude of up to 100 have been found to give excellent products.

For the basic environment ammonia, ammonium hydroxide, is suitably used but ammonium compounds and amines, such as suitable ammonium salts, short chain amines, which can be primary, secondary or tertiary, and quaternary ammonium hydroxides can also be used. By short chain amines and quaternary ammonium compounds are herein meant such containing alkyl or hydroxy alkyl groups with from 1 to 4 carbon atoms. Ammonia is preferred as it has a better effect on the particle surface due to low steric hindrance. The mole ratio $SiO_2$ to basic compound in the solution based on amine or ammonium, preferably ammonium hydroxide, can vary within wide limits and is suitably within the range of from 10:1 to 100:1.

The sol solution prepared as disclosed above is then emulsified in an organic medium giving a two-phase system with water. The medium is not miscible or has a limited solubility or miscibility with water. The sol solution is preferably concentrated before the emulsification to a $SiO_2$ content of at least 10 percent by weight, e.g. by evaporation under vacuum or at atmospheric pressure or by ultrafiltration. The emulsification can be carried out in polar or non-polar solvents or mixtures of these. As examples of suitable solvents can be mentioned various petroleum fractions of aliphatic and/or aromatic type, alcohols, including diols, chlorinated hydrocarbons, ketones and acetates. It has been found that it is particularly suitable to use solvents which are partially soluble in water as this prevents negative effects on the sol drops, such as an unfavourable vapour formation directly from the sol drop. Further, with regard to the final particle properties it is advantageous to use an emulsification phase which has a density of about the same magnitude as water for creating a stable emulsion with spherical drops, almost without agglomeration tendencies between the emulsion drops. As emulsification phase it is thus suitable to use a solvent or solvent mixture with a density of from about 980 to about 1100 $kg/m^3$ and advantageously with a solubility of water exceeding 1 percent by weight and up to about 10. The emulsification is carried out in the presence of a surface active agent which may be an anionic, cationic, nonionic or amphoteric emulsifier or a thickening agent or a protective colloid. As examples of ionic emulsifiers which have been used in the preparation of silica particles and which can be used in the present method can be mentioned fatty acids and fatty amines. As examples of non-ionic emulsifiers can be mentioned partial fatty acid esters of polyvalent alcohols and anhydro derivatives of these. As examples of suitable surface active agents which are generally classified as thickening agents or protective colloids can be mentioned synthetic and natural polymers such as polyvinyl alcohol, polyvinylpyrrolidone, water soluble cellulose derivatives, gelatin, starch etc. Blends of suitable surface active agents can of course also be used. The amount of surface active agent is usually within the range of from 0.5 g to 10 g per liter of sol volume. As the sol growth has been carried out in a basic environment based on ammonium or amines small amounts of such bases will be present in the emulsification step and will have a positive influence on the particle properties. The emulsification is carried out to the desired drop size, which mainly is controlled through the mixing intensity by varying the stirring speed or by varying the flow rate via throttle valves or static mixer elements.

The next step in the preparation method is gelling of the formed drops and this is achieved by dewatering under controlled temperature and pH conditions. The temperature is suitably kept between 30° and 100° C. pH is adjusted either by evaporation of ammonia or by addition of acid to a pH within the range of from 5 to 9. Suitable acids for this purpose are organic acids such as citric acid, acetic acid, oxalic acid etc. The gelling step is preferably carried out in the presence of a substance which accelerates the gelling and this can then suitably be added already in the emulsification step. By the presence of such a substance the gelling will proceed more rapidly and thereby it is avoided that the sol particles become to densely packed before the gelation which has a negative influence on the particles and the porosity. As gelling accelerating substances such which do not introduce metal impurities and which do not have a negative effect on the $SiO_2$ material can be used. As some examples of gel accelerators can be mentioned quaternary ammonium compounds, such as 3-chloro-2-hydroxypropyl-trimethylammonium chloride and hexamethylenetetramine.

The prepared gel particles shall then be heat treated for removal of organic material Before this step water is first removed from the particles and these are separated from the solvent phase. Calcination is carried out to remove substantially all organic material. Calcination is carried out at a high temperature, suitably at a temperature of at least about 500° C., and especially at temperatures of at least about 600° C., so that all organic carbon is removed. The calcination is suitably carried out at temperatures above 650° C. and up to about 850° C. During the calcination the silica surface is also affected since silanol groups are dehydrated which influences the surface properties of the products. It is well known that the silica surface is gradually dehydrated within the temperature range of from 200° to 1000° C. To counteract this dehydration it is advantageous to carry out the heat treatment in this step with a certain admixture of steam and at temperatures below 750° C. Since the $SiO_2$ particles which have been prepared according to the above described process have a very high purity the calcination can be carried out at sufficiently high temperatures. If the particles, which is the case when the sol grows in a NaOH environment, have high alkali metal contents calcination cannot be carried out at the required high temperature since the melting point of the $SiO_2$ material in this case will be to low.

The present method also comprises a post-treatment of the particles with a basic solution based on ammonium or amines and this step is essential since a narrow pore size distribution and mechanical strength are secured by this. The post-treatment also contributes to the excellent chromatography properties of the product. As earlier stated the basic solution based on ammonium or amines can be based on ammonia, ammonium salts or short chain amines or quaternary ammonium compounds, whereby ammonia is preferred. It is per se known to post-treat silica particles with ammonia in aqueous or gas phase. The post-treatment according to the present invention can be carried out either at atmospheric pressure and at temperatures from room temperature up to reflux, during a time of from 1 to 150 hours, or under pressure. The post-treatment according to the method shall make the pore size of the silica particles more narrow by giving a certain re-distribution of silicon dioxide so that the pore size distribution becomes more narrow while the total pore volume is maintained. The structure is further consolidated to good mechanical strength. The concentration of base in the solutions which are used should be sufficient for giving the desired solubility of $SiO_2$ from the surface. For ammonia the concentration is suitably within the range of from 1 to 15 percent by weight, preferably within the range of from 2 to 8 percent by weight. A 1% ammonia solution has a pH of about 11.3 and other amines and ammonium bases are used in concentrations which give the corresponding pH values and higher. By the post-treatment a modification of the silica surface is also obtained which gives good properties in most applications of silica particles which are dependent on their surface and affinity properties.

By the process of the invention particles having a size within the range of from 1 to 100 $\mu$m can be prepared and they can be prepared with a narrow particle size distribution within this range by control of the drop size of the sol solution in the steps 3) and 4). If desired the final product can of course be brought to desired particle size distribution by mechanical separation of desired fraction. The process as disclosed above gives the essential steps for obtaining particles with the specified purity and porosity properties. It is of course within the scope of the invention that further steps can be incorporated, but these steps must of course not add undesired metals. For example, the silica sol can, as known, be concentrated before emulsification, for example by evaporation. It is further suitable to wash the particles, e.g. with alcohol and water, before the high temperature treatment and after this the particles can, if so desired, be treated with pure water vapour to give a certain rehydroxylation. Per se known post-treatment with acids such as hydrochloric acid, sulphuric acid, nitric acid and weaker acids, such as citric acid, acetic acid, oxalic acid, and complexing agents such as EDTA can also be carried out before and/or after the treatment of the gel particles in the basic environment. As mentioned above, the final product can be further classified with regard to size, for example by sieving.

The present invention also relates to the use of silica particles which are substantially spherical and have a size within the range of from 1 $\mu$m to 100 $\mu$m, a pore size distribution where the part of pore volume within the range of from 0.5d to 1.5d, where d is the mean pore diameter, is greater than 90% and an alkali metal content below 100 ppm in separation processes and processes based on surface adsorption.

As has been mentioned, silica particles according to the invention are particularly suitable in chromatographic applications and the use of them as packing materials constitutes a preferred use. They can hereby be used in all types of chromatography such as adsorption, ion exchange, gel permeation chromatography and affinity chromatography. The good porosity properties, the high degree of purity and the fact that the particles are essentially free from micropores in combination with their mechanical stability mean that the particles fulfil the very high requirements for this application and they can be used for separation of biomolecules such as proteins and enzymes and at HPLC chromatography. The actual use of the silica particles is per se conventional, i.e. the particles are uniformly packed in the column, or the reaction zone, to be used, after optional derivatization, such as silanization, with regard to the separation to be carried out, and the chromatography is carried out in per se known manner. The present particles show very good ageing stability at this use, i.e. they give the same good chromatography results in several consecutive runs, which is an extremely important advantage.

Enzymes are often used as catalysts. It is very advantageous if the enzyme can easily be separated from the solution in which it works, for example by having the enzyme attached to the surface of greater particles. The particles of the present invention are, thanks to their large surface and pore structure, very suitable for enzymes and other large biomolecules. Well known silanization reagents can advantageously be used for attaching the enzyme to the silica surface.

When the silica particles according to the invention are used as catalysts or catalyst carriers this is also in a per se known manner and they can herein be used in known applications. They can, for example, be used as catalysts in chemical industry or as exhaust gas catalysts and hereby the catalytic active component or components are added to the silica particles in a known manner, for example by impregnation of the particles with a solution of the catalytic active substance.

EXAMPLE 1

1) Preparation of Silica Hydrosol 1.2 kg of chemically pure sodium hydroxide was dissolved in 10 kg of deionized water. 3.1 kg of pure silica, obtained through hydrolysis of tetraethoxysilane, were then dissolved in the solution. The dissolution was carried out under vigorous agitation at a temperature of 75° C. until a clear, homogenous solution of sodium silicate had been formed.

6.3 kg of the sodium silicate solution was diluted with deionized water to 10 kg of solution. The sodium silicate of the solution was then converted to a silica sol by ion exchange in a cation exchanger filled with Amberlite ® IRA 120. The prepared sol had a pH of 3 and contained 5.5 percent by weight of $SiO_2$. The alkali metal content of the sol was 25 ppm and the particle size about 1 to 2 nm.

2) Sol Growth

Using sol prepared according to the above growth of sol was carried out in a couple of different ways.

2a) To 4240 g of sol prepared according to 1) 90 g of a 5% ammonium hydroxide solution were added and the mixture was then heated to 95° C. under agitation. The temperature was then kept constant during 170 minutes whereafter the sol was cooled to room temperature. The sol was concentrated to 12.5% by weight of $SiO_2$ by evaporation under vacuum.

The pH of the prepared sol was measured and was 9.20 and the specific surface was 450 $m^2/g$ $SiO_2$. The particle size distribution was measured by HPGPC (High Performance Gel Permeation Chromatography). The measuring was carried out in column type ShodexR OHpak $^B$806. The mobile phase was a solution of 0.05M $NaHCO_3$ adjusted to pH 9.2 with NaOH. The flow of the mobile phase was kept constant at 1 ml/min and at room temperature. The length of the column was 500 mm. As detector RI (refractive index) was used. The particle size distribution of the sol was then characterized by the following elution volumes: from the injection of the sol sample to the highest peak height, the elution volume between the flanks of the peak measured at 0.5 of the peak height and the elution volume between the flanks of the peak measured at 0.1 of the peak height from the base. The sol was found to have the following elution volumes: 16.24 ml at maximum peak height, 2.09 ml for the peak width at 0.5 of the maximum peak height and 3.80 ml for the peak width at 0.1 of the maximum peak height.

2b) 40.5 g of 5% ammonium hydroxide solution were charged to a reactor vessel and heated to 50° C. Under agitation 4.79 kg of a sol prepared according to 1) were then added continuously during 2 hours. After that, additionally 270 g of 5% ammonium hydroxide and 57.4 kg of the acid sol were added during 7 hours at a constant temperature of 50° C. When the additions were completed the temperature was raised to 95° C. and kept at that for about 30 minutes. The sol was then rapidly cooled to room temperature.

The $SiO_2$ content of the finished sol was 5.48%, the pH was 8.88 and the specific surface was measured to 130 $m^2/g$ $SiO_2$. The particle size distribution was measured with HPGPC as described above and characterized by the following elution volumes: 14.65 ml at the maximum peak height, 1.69 ml for the peak width at 0.5 of the maximum peak height and 3.18 ml for the peak width at 0.1 of the maximum peak height.

2c) To a smaller industrial reactor 600 g of concentrated ammonium hydroxide and 95 kg of acid sol prepared according to 1) were charged under agitation and the mixture was heated from room temperature to 95° C. and this took about 60 minutes. Heating and agitation were then kept constant for 180 minutes, whereafter the mixture was cooled to room temperature. The sol was concentrated by evaporation under vacuum to a $SiO_2$ content of 13 percent by weight. The pH of the sol was 9.00 and the specific surface was measured to 380 $m^2/g$ $SiO_2$.

A small amount of the sol was evaporated to a solid gel which was then analyzed for common metal impurities by means of AAS (atomic absorption spectroscopy). The contents of Na, Al and Fe were determined to 25, 15 and 15 ppm respectively, calculated on solid silica material.

The mean size of the sol particles was 7.2 nm and the particle size distribution characterized as elution volumes was the following: 16.09 ml at maximum peak height, 2.37 ml and 4.35 ml for peak width at 0.5 and 0.1, respectively, of maximum peak height.

3) Gel Preparation

Starting from sols prepared as above gel particles were prepared in a couple of different ways.

3a) In a round liter flask the following were mixed: 200 g of benzyl alcohol, 8 g of a 1.7% aqueous solution of cellulose ether (Bermocoll 230 G ®), 10 g of deionized water, 1 g of concentrated ammonia solution in water and 10 g of a solution containing 19% by weight of hexamethylene tetramine dissolved in benzyl alcohol saturated with water. The mixing was carried out at room temperature until a clear, homogenous solution was obtained.

50 g of hydrosol prepared according to 2a) were added to the mixture under vigorous agitation which was adjusted in such a manner as to give an emulsion with a hydrosol drop size of between 10 and 30 μm after about 5 minutes of agitation. The agitation was then stopped and the mixture was allowed to stand during about 15 minutes. The emulsion was thereafter heated under mild agitation to about 58° C. and distilled under vacuum until the volume in the flask had been reduced by about 45 to 50 ml.

The mixture did now contain spherical silica particles and these were filtered off. After washing with ethanol and water the silica particles were calcined in an oven at 600° C. for 3 hours. During the calcination 80 ml of water were added.

The pore volume after the calcination was determined to 0.70 ml/g.

3b) This experiment was carried out in accordance with 3a) but with the difference that 3 ml of 33% acetic acid were mixed into the emulsion just before the heating and distillation and that the distillation was carried out at atmospheric pressure whereby the temperature was 99° C. The pore volume after calcination, which was carried out without addition of water, was 2.04 ml/g.

3c) This experiment was carried out according to 3a) but with the difference that 3 ml of 33% acetic acid was mixed into the emulsion before the heating and distillation. The pore volume after calcination, which in this case was carried out without addition of water, was 1.03 ml/g.

3d) This experiment was carried out in accordance with 3a) but with the difference that 2.5 ml of 33% acetic acid were mixed into the emulsion before heating and distillation. The pH of the emulsion was then lowered from 9.20 to 6.28.

The pore volume after calcination was 0.96 ml/g.

3e) This experiment was carried out in accordance with 3a) but with the difference that 3.5 ml of 33% acetic acid were added to the emulsion just before the heating and distillation. The pH of the emulsion was then changed from 9.20 to 5.86. The pore volume after calcination, which in this case was carried out without addition of water, was 1.26 ml/g.

3f) To a 250 l reactor vessel the following were charged: 98.5 kg of benzyl alcohol, 5 kg of deionized water, 4 kg of cellulose ether (Bermocoll E ®) as a 1.7% aqueous solution and 0.5 kg of hexamethylenetetramine dissolved in 3 kg of benzyl alcohol, saturated with water. The reactor contents were mixed to a homogenous, clear solution at room temperature.

20.3 kg of a sol prepared according to 2c) were mixed with the benzyl alcohol solution under vigorous agitation which was adjusted to give an emulsion with a hydrosol drop size of between 10 and 30 μm after about 15 minutes. The agitation was then stopped and the mixture was allowed to stand during about 60 minutes.

Under mild agitation 150 ml of 33% acetic acid were mixed into the emulsion and the pH was thereby changed from 8.85 to 7.50. Soon after the addition of acetic acid the mixture was heated and distilled under vacuum at about 34° C. When about 26 liters of water had been distilled off from the mixture in the reactor the distillation was stopped and the mixture which was now a suspension of spherical silica particles in the benzyl alcohol solution was centrifuged. The silica material in the centrifuge was washed with 25 l of ethanol and thereafter with 100 l of deionized water.

The silica material was then dried in a vacuum drying cabinet and calcined in an oven at about 750° C. for 16 hours. The specific surface of the material was measured to 360 $m^2/g$ and the pore volume to 0.98 ml/g.

To show the influence of high temperature during the calcination on pore characteristics the following experiments were carried out. Silica material was prepared according to 3c) but at the emulsification a commercial silica sol with a specific surface of 500 m$^2$/g stabilized in NaOH to a pH of 9.3 was used. The silica sol contained 15 percent by weight of SiO$_2$. The metal contents in the material were measured with AAS to: Na 660 ppm, Al 320 ppm and Fe 155 ppm. This material, A, and material according to the present invention prepared as described in 3c), B, with the following metal contents: Na 25 ppm, Al 30 ppm and Fe 20 ppm, were calcined in an oven at 600° C. for three hours. Samples were taken from both material and the calcination was continued for a further 21 hours. The same procedure was repeated at 750° C. Pore volume and specific surface was measured for each calcination sample.

|  |  | 600° C./ 3 h | 600° C./ 24 h | 750° C./ 3 h | 750° C./ 24 h |
|---|---|---|---|---|---|
| Pore volume ml/g | A | 0.99 | 0.92 | 0.82 | 0.70 |
|  | B | 1.18 | 1.18 | 1.15 | 1.13 |
| Spec. surface m$^2$/g | A | 420 | 390 | 360 | 340 |
|  | B | 425 | 425 | 410 | 400 |

4) Post-Treatment

The silica material prepared according to 3f) above was post-treated in 0.1M pure HCl for about 3 hours at about 98° C. It was then washed with deionized water until it was free from acid and dried at about 150° C. Then an additional post-treatment was carried out with a 6% NH$_4$OH solution at room temperature for about 80 hours. The thus treated material was then washed until the pH of the wash water was about 7.5 and then dried at 150° C.

In the table below is shown the effect of post-treatment in ammoniacal environment on the porosity. Comparison is made with silica particles prepared according to 3f) and post-treated with hydrochloric acid as above but not with ammoniacal solution and with a number of commercial silica materials of chromatography quality. The commercial materials were the following, where registered trade marks and mean particle size are given,: A) Nucleosil 100-5, 5 μm, B) Lichrospher, 5 μm, C) Zorbax, 5 μm, D) Partisil, 5 μm. The particles according to the above post-treated with only hydrochloric acid are designated as E and the particles treated with hydrochloric acid and ammonia solution as F.

| Material | d nm | Pore volume % <0.5d | % >1.5d | tot ml/g |
|---|---|---|---|---|
| A | 12.1 | 6.5 | 24 | 1.07 |
| B | 13.5 | 5.5 | 7.3 | 1.26 |
| C | 7.9 | 12.0 | 18.0 | 0.61 |
| D | 9.5 | 10.0 | 16.0 | 0.94 |
| E | 10.8 | 8.0 | 1.6 | 0.98 |
| F | 11.2 | 2.8 | 1.8 | 1.02 |

EXAMPLE 2

In this example the derivatization of silica particles according to the invention and the use of these for chromatography are shown.

Silica particles prepared according to the invention having a mean particle size of 9 μm, a mean pore diameter of d=11.6 nm and a pore size distribution with 95% of the pore volume within the range of 0.5d to 1.5d and an alkali metal content of 30 ppm were used. The particles were derivatized with octadecylchlorosilane according to the following. Dimethyloctadecylchlorosilane (4.72 g, 13.6 mmoles) and imidazole (3.7 g, 54.4 mmoles) were added to a slurry of the silica particles (4.7 g in 50 ml of dried toluene) and the mixture was refluxed during 18 hours. Trimethylchlorosilane (1.7 ml, 13.6 mmoles) were added and the reflux was continued for additionally 8 hours. The modified ODS-silica material was filtered off and washed with toluene, methylene chloride, acetone and methanol. The carbon covering was determined by elementary analysis to 19.06% or 2.93μ mol/m$^2$.

The derivatized silica material was used for separation of a standard mixture of test substances according to the Table below. The chromatography column (200×4.6 mm) was packed using slurry packing technique. As eluent acetonitrile (70%) mixed with water (30%) was used at a flow of 2 ml/min.

| Test substance | Retention time min | Asymmetry factor |
|---|---|---|
| Benzamide | 1.08 | 1.1 |
| Benzyl alcohol | 1.26 | 1.1 |
| Benzaldehyd | 1.61 | 1.0 |
| Methylbenzoate | 1.99 | 1.0 |
| Toluene | 3.01 | 1.0 |
| Ethylbenzene | 3.88 | 1.0 |
| n-propylbenzene | 5.40 | 1.0 |
| n-butylbenzene | 7.67 | 1.0 |

From the Table it is evident that hydrophobic and hydrophilic substances are separated with well distinct retention times and that all test substances give symmetrical peaks. The asymmetry factor is defined as $(t_{tail}-t_{max})/(t_{max}-t_{front})$ where $t_{max}$ corresponds to the time for the peak apex and $t_{front}$ and $t_{tail}$ respectively correspond to the time for the front side respectively the back side at 10% of maximum peak height.

We claim:
1. A process for the preparation of substantially spherical silica particles, comprising the steps of:
   1) preparing at least one acid aqueous silica sol with an alkali metal content below 100 ppm and a particle size essentially below 3 nm;
   2) heat treating the prepared sol in an ammonium or amine basic solution resulting in growth of the sol particles to a size corresponding to an area within the range of from about 50 to about 500 m$^2$/g;
   3) emulsifying the sol, after optional concentration, in an organic medium which is not miscible with water, or has a limited miscibility or solubility with water, and in the presence of a surface active agent;
   4) gelling the formed sol drops by dewatering at a temperature of from about 30° C. to about 100° C. and at a pH of from about 5 to about 9;
   5) heat treating the produced gel particles for removal of substantially all organic material; and
   6) post-treating the gel particles in a basic environment containing ammonium or an amine.

2. A process according to claim 1, characterized in that gelling is carried out in the presence of a substance which accelerates the gelling.

3. A process according to claim 1, characterized in that ammonium hydroxide solution is used in steps 2) and 6).

4. A process according to claim 1, characterized in that the sol which is emulsified is polydisperse.

5. A process according to claim 1, characterized in that the heat treatment of the gel particles is carried out at a temperature of at least 600° C.

6. A process according to claim 1, characterized in that the post-treatment in the ammonium or amine basic environment is carried out at a pH of at least about 11.3.

7. A process for the preparation of silica particles, comprising the steps of:
   1) preparing at least one acid aqueous silica sol with an alkali metal content below 100 ppm and a particle size essentially below 3 nm;
   2) heat treating the prepared sol in an ammonium or amine basic solution resulting in growth of the sol particles to a size corresponding to an area within the range of from about 50 to about 500 $m^2/g$;
   3) emulsifying the sol, after optional concentration, in an organic medium which is not miscible with water, or has a limited miscibility or solubility with water, and in the presence of a surface active agent;
   4) gelling the formed sol drops by dewatering at a temperature of from about 30° C. to about 100° C. and at a pH of from about 5 to about 9;
   5) heat treating the produced gel particles for removal of substantially all organic material; and
   6) post-treating the gel particles in a basic environment containing ammonium or an amine;
   wherein the silica particles are substantially spherical and have a particle size within the range of from about 1 to about 100 μm, a pore size distribution where the part of the pore volume within the range of from 0.5d to 1.5d, where d is the mean pore diameter, is greater than 90% and an alkali metal content below 100 ppm.

8. A process according to claim 7, wherein gelling is carried out in the presence of a substance which accelerates the gelling.

9. A process according to claim 7, wherein ammonium hydroxide solution is used in steps 2) and 6).

10. A process according to claim 7, wherein the sol which is emulsified is polydisperse.

11. A process according to claim 7, wherein the heat treatment of the gel particles is carried out at a temperature of at least 600° C.

12. A process according to claim 7, wherein the post-treatment in the ammonium or amine basic environment is carried out at a pH of at least about 11.3.

* * * * *